United States Patent
Wang

(10) Patent No.: US 8,262,953 B2
(45) Date of Patent: Sep. 11, 2012

(54) METHOD FOR MAKING OPTICAL DIFFUSER

(75) Inventor: Jau-Shuenn Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 39 days.

(21) Appl. No.: 12/873,223

(22) Filed: Aug. 31, 2010

(65) Prior Publication Data

US 2011/0304065 A1    Dec. 15, 2011

(51) Int. Cl.
*B29D 11/00*    (2006.01)

(52) U.S. Cl. ........................................................ 264/2.7

(58) Field of Classification Search .................. 264/1.34, 264/293, 284, 1.24, 1.7, 2.3, 316, 319, 334, 264/337–338
See application file for complete search history.

(56) References Cited

U.S. PATENT DOCUMENTS

| | | | |
|---|---|---|---|
| 2001/0053074 A1* | 12/2001 | Onishi et al. | 362/31 |
| 2002/0154491 A1* | 10/2002 | Suhara | 361/752 |
| 2003/0180476 A1* | 9/2003 | Yamashita et al. | 428/1.1 |
| 2004/0054372 A1* | 3/2004 | Corden et al. | 606/77 |
| 2004/0167499 A1* | 8/2004 | Grove et al. | 606/9 |
| 2009/0285930 A1* | 11/2009 | Hirata | 425/588 |

* cited by examiner

*Primary Examiner* — Christina Johnson
*Assistant Examiner* — Xue Liu
(74) *Attorney, Agent, or Firm* — Altis Law Group, Inc.

(57) ABSTRACT

A method for making an optical diffuser includes the following steps: providing a pressing plate and a substrate; coating a layer of PTFE film on the pressing plate; sandblasting and grinding the layer of PTFE film to form a number of uniformly distributed micro-concaves; coating a layer of acrylic resin onto the substrate; pressing the layer of PTFE film with the pressing plate onto the layer of acrylic resin to form a number of uniformly distributed raised micro-dots on the layer of acrylic resin; and separating the layer of acrylic resin from the layer of PTFE film to obtain an optical diffuser.

7 Claims, 1 Drawing Sheet

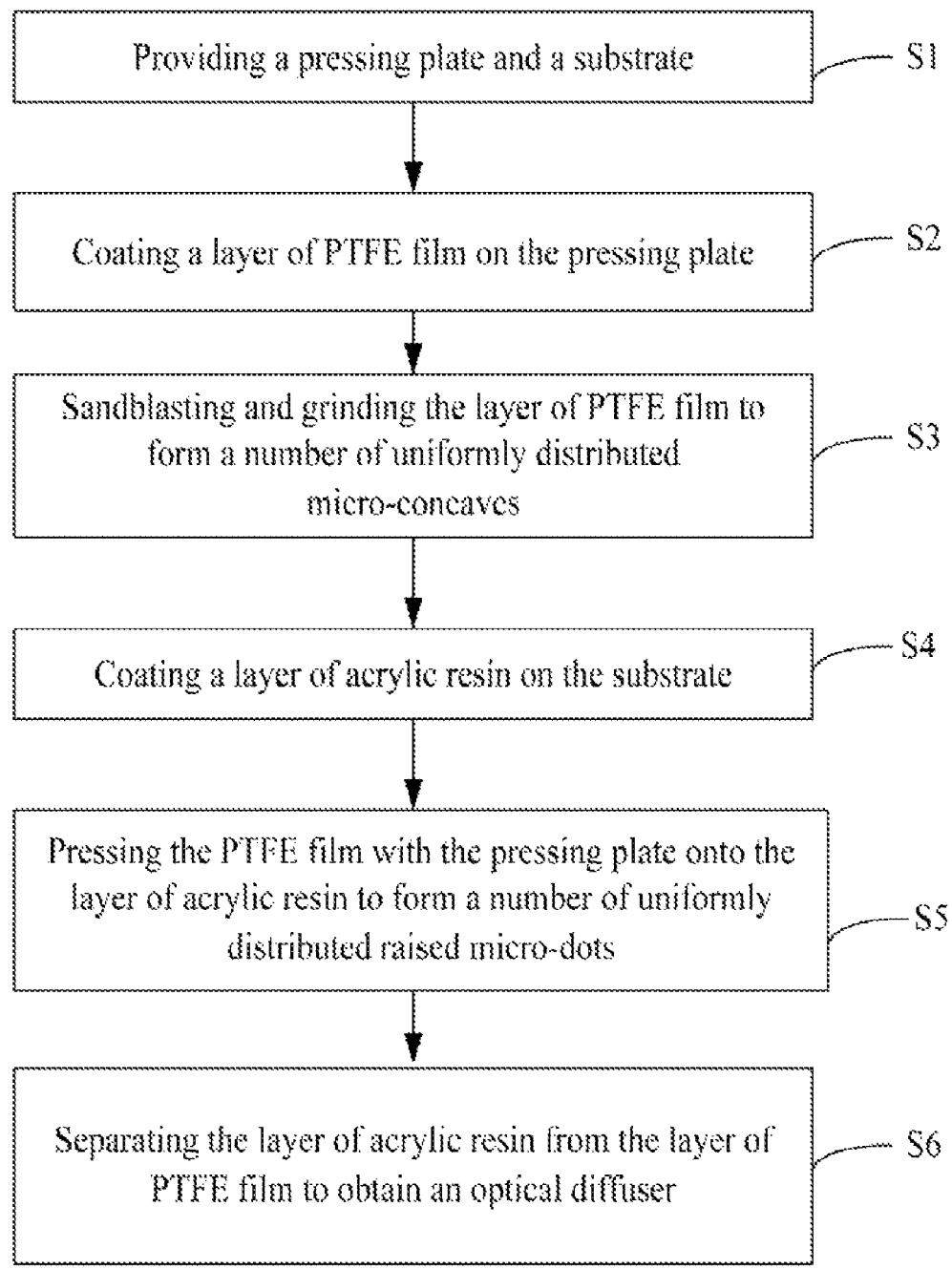

METHOD FOR MAKING OPTICAL DIFFUSER

CROSS-REFERENCE TO RELATED APPLICATION

This application is related to, and claims the benefit of, a foreign priority application filed in Taiwan as Application No. 099118976 on Jun. 11, 2010. The related application is incorporated herein by reference.

BACKGROUND

1. Technical Field

The present disclosure relates to a method for making an optical diffuser.

2. Description of Related Art

Generally, an optical diffuser includes a transparent plate and a layer of acrylic resin coated on a surface of the transparent plate. A surface of the acrylic resin layer away from the transparent plate forms a number of raised micro-dots. The rays passing through the optical diffuser can be reflected, refracted, and diffracted, and thus, are homogeneously diffused. Currently, a method for making an optical diffuser includes the following steps: providing a pressing plate coating with a layer of metal; forming a number of micro-concaves in the surface of the metal; pressing the metal layer with the pressing plate onto a layer of acrylic resin coated on a transparent substrate to form a number of raised micro-dots; separating the layer of acrylic resin from the metal layer to obtain an optical diffuser. However, the acrylic resin is acidic and thus readily reacts with the metal of the pressing plate. As a result, the acrylic resin layer will adhere to the metal, preventing accurately acquiring the desired optical diffuser shape.

Therefore, it is desirable to provide a method for making an optical diffuser, which can overcome the above-discussed shortcomings.

BRIEF DESCRIPTION OF THE DRAWING

Many aspects of the embodiments should be better understood with reference to the following drawing. The components in the drawing are not necessarily drawn to scale, the emphasis instead being placed upon clearly illustrating the principles of the present disclosure.

The FIGURE is a flow chart of a method of making an optical diffuser, according to an exemplary embodiment.

DETAILED DESCRIPTION

Referring to the FIGURE, a method of making an optical diffuser is shown. The method includes the following steps.

S1: providing a pressing plate and a substrate. The pressing plate is made of rigid metal, and thus the pressing plate cannot be readily deformed. In this embodiment, the pressing plate is made of iron. The substrate is made of polyethylene terephthalate (PET) or polycarbonate (PC).

S2: coating a layer of polytetrafluoroethene (PTFE) film on the pressing plate. The PTFE film is a kind of macromolecular compound with excellent chemical stability and corrosion resistance.

S3: sandblasting and grinding the layer of PTFE film to form a number of uniformly distributed micro-concaves. Sandblasting is used to pit the PTFE film to form a great number of rough uniformly distributed micro-concaves. Then grinding is performed on the inner surfaces of the rough micro-concaves to achieve smooth micro-concaves of uniform size. It can be understood that the distribution density of the micro-concaves can be controlled by the quantity and size of sand used.

S4: coating a layer of acrylic resin on the substrate.

S5: pressing the layer of PTFE film with the pressing plate onto the layer of acrylic resin to form a number of uniformly distributed raised micro-dots. In this embodiment, the pressure applied using the pressing plate is in a range of about 0.5 kilograms (kg)/meters (m) squared~0.6 kg/m$^2$. The PTFE film is pressed for 1 second~30 seconds. Because the acrylic resin is acidically weak, and the PTFE film has low chemical reactivity, the PTFE film will have little or no chemical reaction with the acrylic resin.

S6: separating the layer of acrylic resin from the layer of PTFE film to obtain an optical diffuser. The optical diffuser comprises the substrate and the layer of acrylic resin having a great number of raised micro-dots. Because acrylic resin does not easily chemically react with the PTFE film, the acrylic resin will not adhere to the PTFE film, therefore, the pressing plate will not be damaged, and an accurately shaped optical diffuser can be obtained.

It can be understood that, the pressing plate will be used repeatedly, when making other optical diffuser, the user only need to coat a layer of acrylic resin on the substrate, and pressing the PTFE film on the acrylic resin using the pressing plate, and then separate the acrylic resin from the PTFE film to obtain an optical diffuser.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A method for making an optical diffuser, comprising:
   providing a pressing plate and a substrate;
   coating a layer of PTFE film on the pressing plate;
   sandblasting and grinding the layer of PTFE film to form a plurality of uniformly distributed micro-concaves;
   coating a layer of acrylic resin on the substrate;
   pressing the layer of PTFE film with the pressing plate onto the layer of acrylic resin to form a plurality of uniformly distributed raised micro-dots on the layer of acrylic resin; and
   separating the layer of acrylic resin from the layer of PTFE film to obtain an optical diffuser.

2. The method of claim 1, wherein the pressing plate is made of rigid metal.

3. The method of claim 1, wherein the substrate is made of PET or PC.

4. The method of claim 1, wherein the pressure applied using the pressing plate is in a range of about 0.5 kg/m$^2$~0.6 kg/m$^2$.

5. The method of claim 1, wherein the PTFE film is pressed for 1 second~30 seconds.

6. The method of claim 1, wherein sandblasting the layer of PTFE film forms a plurality of uniformly distributed rough micro-concaves, and the grinding is performed on inner surfaces of the rough micro-concaves to form the plurality of uniformly distributed micro-concaves.

7. The method of claim 1, wherein the pressing plate and the layer of PTFE film formed on the pressing plate are united as a whole single body.

* * * * *

UNITED STATES PATENT AND TRADEMARK OFFICE
CERTIFICATE OF CORRECTION

PATENT NO. : 8,262,953 B2
APPLICATION NO. : 12/873223
DATED : September 11, 2012
INVENTOR(S) : Jau-Shuenn Wang Page 1 of 1

It is certified that error appears in the above-identified patent and that said Letters Patent is hereby corrected as shown below:

On the title page, please insert Item (30) regarding "Foreign Application Priority Data" with the following:

-- (30)    Foreign Application Priority Data

Jun. 11, 2010    (TW) .............................099118976 --

Signed and Sealed this
Twenty-ninth Day of October, 2013

Teresa Stanek Rea
*Deputy Director of the United States Patent and Trademark Office*